United States Patent Office 3,294,545
Patented Dec. 27, 1966

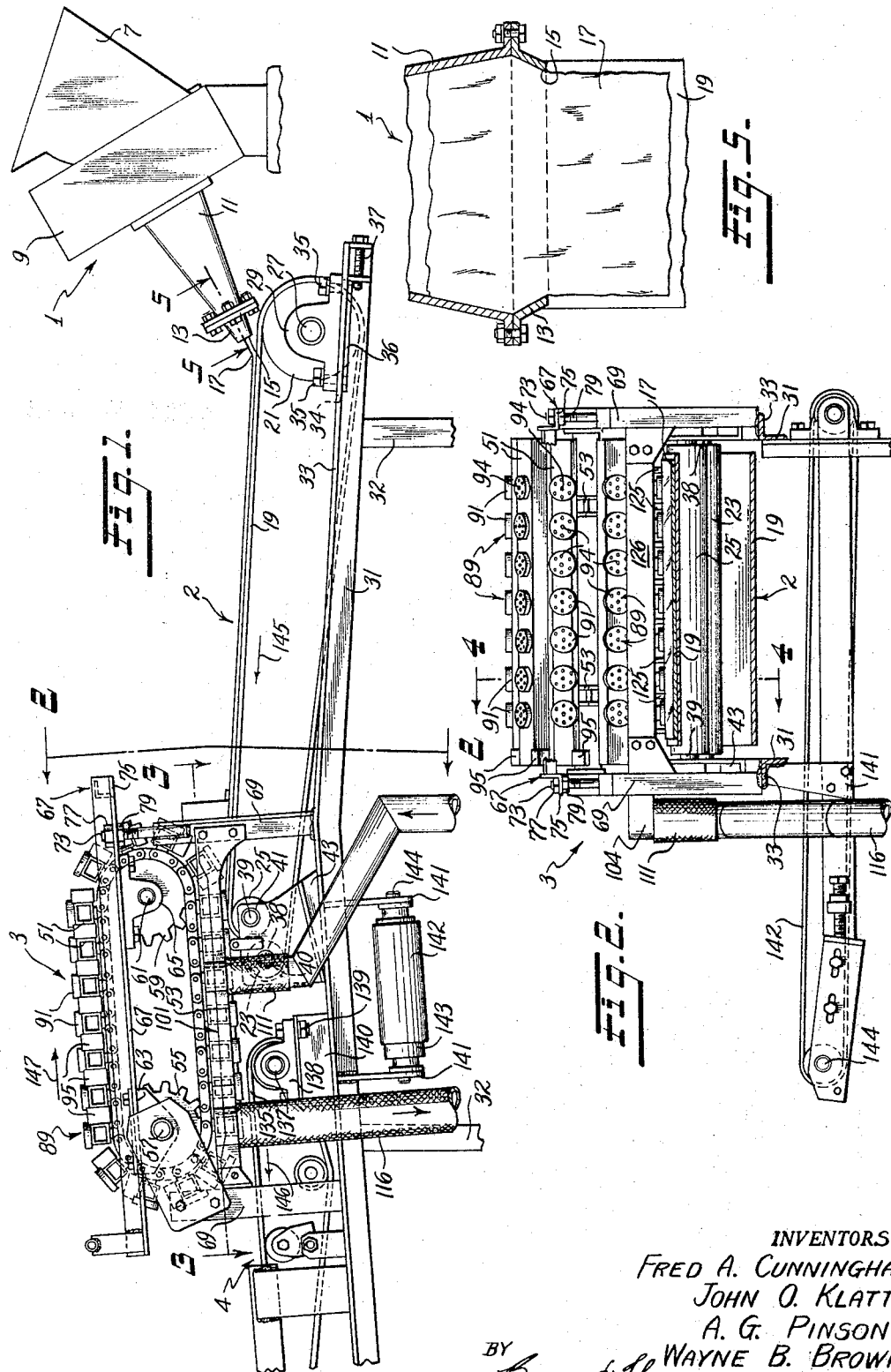

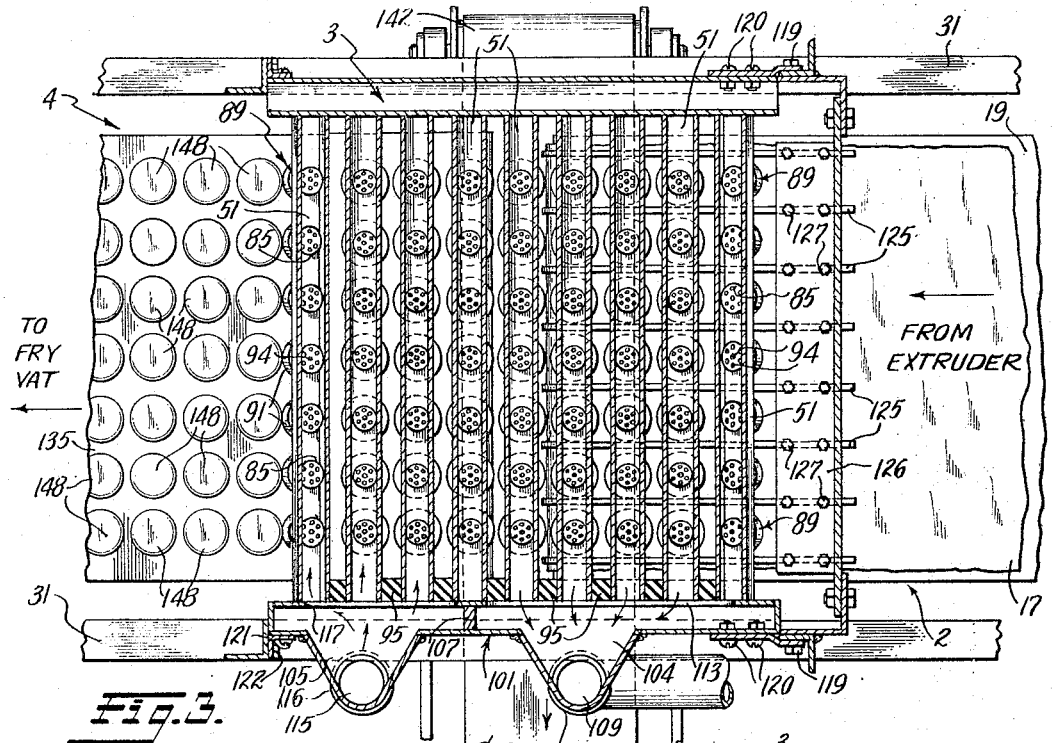

3,294,545
CORN CHIP APPARATUS, METHOD, AND PRODUCT
Fred A. Cunningham, John O. Klatt, A G Pinson, and Wayne B. Brown, all of San Antonio, Tex., assignors to The Facs Manufacturing Company, Inc., San Antonio, Tex., a corporation of Texas
Filed Mar. 22, 1962, Ser. No. 181,760
5 Claims. (Cl. 99—80)

This invention relates to a method for manufacturing corn chips and the like, as well as to apparatus adapted to be used for this purpose and the product which results therefrom. Corn chips are normally manufactured by a conventional process which includes pre-boiling corn and grinding it into a dough-like substance called masa. The masa is extruded into thin ribbons or strips, which are divided along the length thereof. The resulting dough segments are fried in deep fat or the like, and the end product is a rectangular-shaped chip, quite often curled during the frying operation. While chips of this nature have enjoyed a certain degree of commercial success, primarily due to their taste and flavor, they have suffered from a number of handicaps. In the first place, while the length, width and thickness may be varied within certain limitations, the overall shape is generally the same. Secondly, these chips have a tendency to curl up into irregular shapes which, if they are of any significant size, results in handling difficulties both in the packaging and the actual consumption thereof. Finally, due to their lack of rigidity as well as to their non-planar final shape, the conventional chip is not very suitable for use with the various dips which have gained such widespread acceptance in recent years. Therefore, the desirability of making corn chips of more pleasing configuration, greater rigidity and more nearly planar shape has been recognized in the trade, and various attempts have been made to accomplish these ends.

For example, in the process of Anderson et al. 2,905,559, corn masa is rolled into sheet form and cut into the desired configuration prior to frying. The rolling, however, forms a compacted "skin" on the upper and lower surfaces of the product, tending to seal the same, and a "pillowing" takes place during the frying operation. The patentee is therefore forced to provide a plurality of perforations to serve as vents, but these perforations in turn serve as pockets for the cooking oil which tends to accumulate therein and harden.

Another approach is a process of the type described in Kunce et al. 2,916,378. Again the product is rolled into sheet form but a dehydrating step must be employed to prepare the material for cooking. A third approach is to roll the masa into sheet form, cut it, and then cook it by toasting rather than frying, which gives an entirely different flavor, taste and appearance.

Accordingly, it is a primary object of this invention to provide a novel corn chip of variable size and configuration and one which can be cooked by conventional means without any tendency to curl, pillow, or otherwise become distorted.

Another object is to provide a novel method and apparatus for producing the corn chip referred to in the previous paragraph.

Another object is to provide a method for producing corn chips wherein continuous production may occur at high speeds and in commercially feasible volumes.

Another important object is to provide means for forming masa into various configurations without compacting the surface thereof.

Another object is to provide a corn chip of high quality which is attractive in appearance, appetizing to the taste and convenient to package or consume.

Another object is to provide apparatus for producing a corn chip of the type described, which apparatus may be conveniently employed in existing plants and used in conjunction with existing cooking equipment and the like.

Another object is to provide apparatus of the type described above which is simple in construction, economical in manufacture and durable in use.

Other objects and advantages will be apparent from the following description when taken in conjunction with the accompanying drawings, in which:

FIG. 1 is a side elevational view illustrating corn chip forming apparatus embodying the principles of the present invention;

FIG. 2 is a substantially vertical sectional view taken on the line 2—2 of FIG. 1;

FIG. 3 is a substantially horizontal fragmentary section taken on the line 3—3 of FIG. 1;

FIG. 4 is a vertical section taken on the line 4—4 of FIG. 2; and

FIG. 5 is a fragmentary sectional view of the extruder nozzle, taken on the line 5—5 of FIG. 1.

Referring now more specifically to the drawings, the primary elements of the chip forming apparatus are best illustrated in FIG. 1 where the numeral 1 is used to generally indicate an extruder, which feeds onto a conveyor 2. The forming and transfer unit is positioned at the opposite end of the conveyor and is generally indicated by the numeral 3, and this unit feeds onto a conveyor 4 for delivery to a fry vat (not shown). The fry vat may be of any suitable type, such as that illustrated in Cunningham et al. 2,934,001.

In the embodiment illustrated, the extruder 1 includes a hopper 7 adapted to receive corn masa. This masa may be prepared by any suitable method. For example, the method described in the patent to Cunningham et al. 3,020,162 may be employed, or that described in Doolin 2,002,053. A pump 9 delivers the masa through a tapering throat 11 and in turn through an extrusion nozzle 13 having a thin horizontally disposed die orifice 15. In the present embodiment, the die orifice is approximately sixteen inches in width and one-sixteenth of an inch in height. As the masa emerges from the orifice in a very thin sheet 17 it is received on the upper surface of an endless conveyor belt 19 positioned immediately below the die orifice 15. Belt 19 is trained around a roller 21 at the end thereof adjacent extruder 1, and a similar but smaller roller 23 is employed at the opposite end. A third roller 25 is positioned immediately inwardly from the roller 23 with its upper extremity terminating at a slightly higher level for a purpose which will appear hereinafter. Roller 21 is provided with a shaft 27 which projects from the opposite ends thereof and is rotatably secured in bearing blocks 29. Bearing blocks 29 are in turn mounted on longitudinal frame members 31 which are supported on legs 32. As illustrated, the frame members 31 may each be formed of angle-iron and include an outwardly extending upper flange 33 having a longitudinal slot 34 therein. Bolts 35 extend through openings in the bearing block and through slot 34 to be received in a member 36 underlying the flange, and the bearing blocks are secured thereby in longitudinally adjusted position along the length of frame members 31. Conventional screw adjustment means 37 may be provided to effect this adjustment and the desired amount of tension on belt 19.

Rollers 23 and 25 are fixed on shafts 38 and 39, respectively, which are journaled in bearings 40 and 41. Bearings 40 and 41 are mounted on frame members 31 by any suitable means, such as brackets 43.

The forming and transfer unit 3 comprises a plurality of tubes 51, preferably square in cross section, which are mounted transversely and in closely spaced parallel relationship on a pair of parallel endless chains 53. Chains 53 are respectively trained over a pair of rear sprockets 55 fixed on a common shaft 57, on a pair of forward sprockets 59 fixed on a common shaft 61. Shafts 57 and 61 are journaled in bearing blocks 63 and 65, respectively, mounted on the underside of a horizontal frame member 67 formed of angle-iron or the like. The frame member 67 is positioned in spaced relation above frame member 31 and extends longitudinally beyond the unit 3 in either direction. A pair of support posts 69 extend upwardly from frame member 31 and carry brackets 70 wherein the outer ends of shaft 61 are journaled, to pivotally support the front end of the unit. A pair of rear support posts 69 extend upwardly from frame member 31 and terminate in a screw member 73 adapted to extend through an opening formed in lateral flange 75 of frame member 67. Nuts 77 and 79 disposed on either side of flange 75 serve to lock the forward end of frame member 67 in vertically adjusted position so that the rear of unit 3 closely overlies the forward end of belt 19.

As best illustrated in FIGS. 3 and 4, each tube 51 is provided with a plurality of spaced apertures 85 along the outwardly facing surfaces thereof, and the stem 87 of a forming cup 89 is press fitted therein. The forming cups 89 each include a head portion 91 fitting flush against the outer surface of the respective tube 51 and having a generally concave upper surface, as indicated at 93. A plurality of pressure openings 94 extend through each member 91 between the surface 93 and the interior of tubular members 51. Cup members 91 are preferably formed of Teflon or some other suitable material which will give them adequate hardness and wear resistance and will not tend to adhere to the masa.

A sealing block 95 is secured to each tube 51 at one end thereof. The sealing blocks 95 may be formed of rubber or the like and secured in position on the trailing surface of the tube 51, as by screws (not shown). When adjacent tubes are in horizontal alignment, i.e., at the top or bottom paths of their course of travel, the blocks 95 are compressed therebetween and serve to seal off the gap which would otherwise exist between the tube ends.

A manifold housing, generally indicated by the numeral 101, is positioned adjacent the unit 3 for cooperation with the tubular members 51 during their movement along the lower course of the conveyor. Housing 101 is divided into longitudinally aligned manifold sections 104 and 105 by an intermediate wall 107. Section 104 is an exhaust chamber and has an outer portion provided with an outlet 109. An exhaust pump or the like (not shown) is connected by means of a flexible conduit 111 or the like to the outlet 109 to continuously pump air from the chamber 104. The inner face of chamber 104 is provided with a longitudinal opening 113 and fits snugly against the adjacent ends of the tubes 51 during the rearward portion of their lower course of travel. Opening 113 spans approximately five tube ends, as well as the intermediate sealing blocks 95. The exhaust chamber is placed in relatively airtight communication with the interiors of the respective tubes 51 due to the sealing blocks 95 and the snug-fitting arrangement of the various parts.

The manifold section 105 is a pressure chamber and is provided with an inlet 115 at its outer side adapted to be connected by a flexible conduit 116 to a suitable source of pressure. An opening 117 is provided on the inner face of section 105 for communication with the interior of tubes 51, approximately two at a time, after they have passed the manifold section 104. Housing 101 is secured at either end thereof to the legs 69 and 71, as by bolts 119, 120, 121 and 122.

A plurality of guiding fingers 125 are mounted at their rear extremities on a plate 126, as by screws 127, and are disposed in parallel relation along the forward end of conveyor 2, closely spaced above belt 19 as it reaches a point immediately below unit 3 and passes around rollers 23 and 25. The fingers 125 are transversely spaced to permit the forming cups 91 to extend downwardly therebetween and engage the material 17 on belt 19.

The conveyor 4 comprises an endless belt 135 which may be formed of stainless steel mesh or the like. The belt is trained at the rear end thereof over a roller 136 mounted on a shaft 137. Shaft 137 is in turn journaled at either end thereof in bearing blocks 138. The bearing blocks 138 are secured by bolts 139 or the like to brackets 140 mounted on the longitudinal frame members 31. The forward end (not shown) of conveyor 4 extends to the fry vat.

A transversely disposed conveyor belt, 142, is mounted below frame members 31 in vertically spaced relation below the gap between conveyors 2 and 4. One end of the conveyor 142 is mounted on a roller 143 provided with a shaft 144. The ends of shaft 144 are journaled in support brackets 141 which are suspended from one of the frame members 31. Conveyor 142 extends transversely under the apparatus and outward, and material received thereon is removed to one side of the apparatus from whence it may be returned to the hopper 7 at any conventional conveying means.

When the apparatus is in operation, conveyors 2 and 4 and chains 53 are driven in the direction of arrows 145, 146 and 147, respectively. Any suitable drive means may be employed. For example, sprocket wheels (not shown) fixed on the ends of shafts 27, 61 and 137 may be connected to a power source by means of chains (also not shown). It is important, however, that the peripheral speeds of belt 19 and cup heads 91 be closely synchronized, and the belt 135 should operate at an equal speed or faster. Thus, as the extruded masa emerges in continuous sheet form from the nozzle 17, it is conveyed along belt 19 to a point immediately below unit 3. Here the synchronized rotating cup members 89 are pressed through the sheet to cut out, in this instance, a thin disc 148 of material approximately 1½" in diameter. At this point the tubes 51 on which successive rows of cup members 89 are mounted are in alignment with the opening 113 in the manifold exhaust section 104. Exhaust pressure from the exhaust manifold section 104 is therefore applied through openings 94 and serves to hold the severed discs 148 in position against the surface 93 of the cup.

A stripper wire 149 is secured at its opposite ends to ears 150 mounted on brackets 43 and bears directly against the outer surface of belt 19 between rollers 23 and 25. This eliminates any tendency of the masa discs to adhere to the belt. Guide fingers 125, however, follow the path of the belt at the forward portion thereof and serve to deflect the remaining masa sheet material downwardly, as indicated at 151, to prevent this material from continuing to move horizontally by adherence to the cut out discs. Further travel of the latter material along the belt 19 is prevented by a second stripper wire 152 stretched between the opposed brackets 43.

As the chains 53 rotate, successive tubes 51 pass from alignment with opening 113 to alignment with opening 117. Here the pressure in manifold section 105 is applied through tubes 51 and openings 94 and serves to discharge the cut-out discs 148 onto the conveyor 135. From there the material is carried forward to the fry vat for cooking.

It is important to recognize that the step of extruding corn masa in sheet form is critical inasmuch as the sheet produced thereby does not have compacted, "sealed" surfaces as in the case of rolled sheets. Thus, in the applicants' process, there is no necessity for puncturing or dehydrating the dough product prior to frying because the discs 148 will cook properly in the fry vat without any tendency to "pillow" or otherwise become distorted.

The final product is, therefore, a uniform chip of high quality and flavor and one which is relatively rigid. In the latter connection it should be noted that the present chip is highly resistant to breakage when being packed or handled and is sufficiently strong to be used for dipping, even in relatively stiff dips.

It should be noted from the drawings that the cut-out discs 148 retain a slightly concave configuration due to the concave shape of cup surfaces 93. This disc configuration is substantially maintained during the cooking process and the resultant chip is therefore slightly cup-shaped and provides a convenient surface for receiving dips or spreads. It will be readily apparent, however, that a flat chip can be produced by varying the contour of cup surfaces 93 or, similarly, that a more pronounced cup shape can be effected. Furthermore, it will be obvious to those skilled in the art that the peripheral configuration of the chips may be varied at will, and a wide variety of chip shapes can be effected. By using differently shaped cups at the same time, such a variety may be achieved during a single production run.

Numerous other changes and modifications may be made in the method, apparatus and product described herein without departing from the spirit of the invention or the scope of the annexed claims.

We claim:
1. A method of making corn chips, comprising: delivering corn masa from a source thereof under high pressure through a die orifice to form a continuous thin sheet of substantial width; cutting transverse rows of chip-sized sections from said sheet; separating said sections from the remainder of the sheet and delivering said sections to a cooking station; and frying said sections at said cooking section.

2. A method of making corn chips as defined in claim 1, including the step of returning said remainder of the sheet to said source.

3. A method of making corn chips comprising the steps of: extruding corn masa into a continuous sheet form of substantial width onto a flat surface; severing transverse rows of chip-sized sections from said sheet by a cutter action in the direction of said surface; applying a suction force to said sections to remove them from the said surface; delivering said sections to a cooking station; and frying said sections.

4. The method of claim 3 wherein said surfaces comprises a conveying surface moving in timed relation with respect to the rate of extrusion.

5. An extruded corn masa product formed in thin sheet form having substantially uniform thickness and having a generally rounded peripheral configuration and having a central portion thereof wherein the upper and lower surfaces are offset axially from the respective planes in which the upper and lower surfaces are disposed at the peripheral area of said product to effect a dome-shaped inner section concave in one direction, said chip being generally arch-shaped in cross-sectional configuration.

References Cited by the Examiner
UNITED STATES PATENTS

| | | | |
|---|---|---|---|
| 2,002,053 | 5/1935 | Doolin | 99—80 |
| 2,678,599 | 5/1954 | Maddocks | 99—405 |
| 2,685,249 | 8/1954 | Badger | 99—403 |
| 2,905,559 | 9/1959 | Anderson et al. | 99—80 |
| 2,916,378 | 12/1959 | Kunce et al. | 99—80 |
| 3,020,162 | 2/1962 | Cunningham et al. | 99—80 |
| 3,083,103 | 3/1963 | Anderson et al. | 99—80 |

A. LOUIS MONACELL, *Primary Examiner.*

ABRAHAM H. WINKELSTEIN, NORMAN G. TORCHIN, *Examiners.*

R. S. AULL, *Assistant Examiner.*